United States Patent [19]
Ueda et al.

[11] Patent Number: 5,150,020
[45] Date of Patent: Sep. 22, 1992

[54] DRIVING CONTROLLING METHOD FOR DRUMS OF AUTOMATIC WINDER

[75] Inventors: Yutaka Ueda, Nara; Tadashi Suzuki, Uji, both of Japan

[73] Assignee: Murata Kikai Kabushiki Kaisha, Kyoto, Japan

[21] Appl. No.: 603,262

[22] Filed: Oct. 26, 1990

Related U.S. Application Data

[63] Continuation of Ser. No. 212,187, Jun. 27, 1988, abandoned.

[30] Foreign Application Priority Data

Jul. 2, 1987 [JP] Japan .................... 62-166058

[51] Int. Cl.$^5$ ............................................. H02P 3/18
[52] U.S. Cl. ......................................... 318/87; 318/91
[58] Field of Search ................. 318/86, 87, 88, 78, 318/90, 91; 307/32

[56] References Cited

U.S. PATENT DOCUMENTS

| | | | |
|---|---|---|---|
| 3,514,682 | 5/1970 | Corey . | |
| 3,600,655 | 8/1971 | Karlin et al. | 318/28 |
| 4,034,232 | 7/1977 | Laventure | 307/32 |
| 4,061,948 | 12/1977 | Lamparter | 318/87 |

Primary Examiner—David Smith, Jr.
Attorney, Agent, or Firm—Spensley Horn Jubas & Lubitz

[57] ABSTRACT

In an automatic winder wherein each of a plurality of winding units thereof has a traverse drum driving motor and an inverter for driving the motor, the numbers of those inverters which are to be decelerated and accelerated are controlled in such a manner that the regenerative energy generated upon deceleration of the motors and the motor driving energy may be cancel each other.

17 Claims, 3 Drawing Sheets

DRIVING CONTROLLING METHOD FOR DRUMS OF AUTOMATIC WINDER

This is a continuation of application Ser. No. 07/212,187 filed on Jun. 27, 1988, now abandoned.

FIELD OF THE INVENTION AND RELATED ART STATEMENT

This invention relates to a driving controlling method for drums of an automatic winder.

An automatic winder is already known wherein a yarn is wound onto a package which is contacted with a face of and driven by a traverse drum. In such an automatic winder, when the rotational speed of the traverse drum becomes equal to a multiple or a fraction by an integer of the rotational speed of the package, such a condition takes place that the traversing period and the winding period of the package are synchronized with each other so that a yarn to be wound passes the same yarn path and consequently is wound in an overlapping relationship into a ribbon-like configuration.

Accordingly, various ribbon winding preventing devices have been proposed so far. There is such a proposal as disclosed, for example, in Japanese Utility Model Publication No. 50-4825, that a power switch for a drive motor for a drum is turned on and off so as to yield a slip between the drum and a package.

According to such a method as described above, driving of the motor is such that rapid reduction of the rotational speed cannot be attained readily due to inertial rotation of the drum when the switch is turned off. Accordingly, the slip between the drum and the package is insufficient, and perfect prevention of ribbon windings cannot be attained readily.

OBJECT AND SUMMARY OF THE INVENTION

It is an object of the present invention to provide a method by which a breaking effect for a traverse drum in a winder is very large and prevention of ribbon windings on a package can be attained effectively.

According to an embodiment of the present invention, in an automatic winder wherein each of a plurality of winding units thereof has a traverse drum driving motor and an inverter for driving the motor, the numbers of those inverters which are to be decelerated and accelerated are controlled in such a manner that the regenerative energy generated upon deceleration of the motors and the motor driving energy may be cancel each other.

DETAILED DESCRIPTION OF PREFERRED EMBODIMENTS

An embodiment of the present invention will be described below with reference to the drawings.

Figure 1:
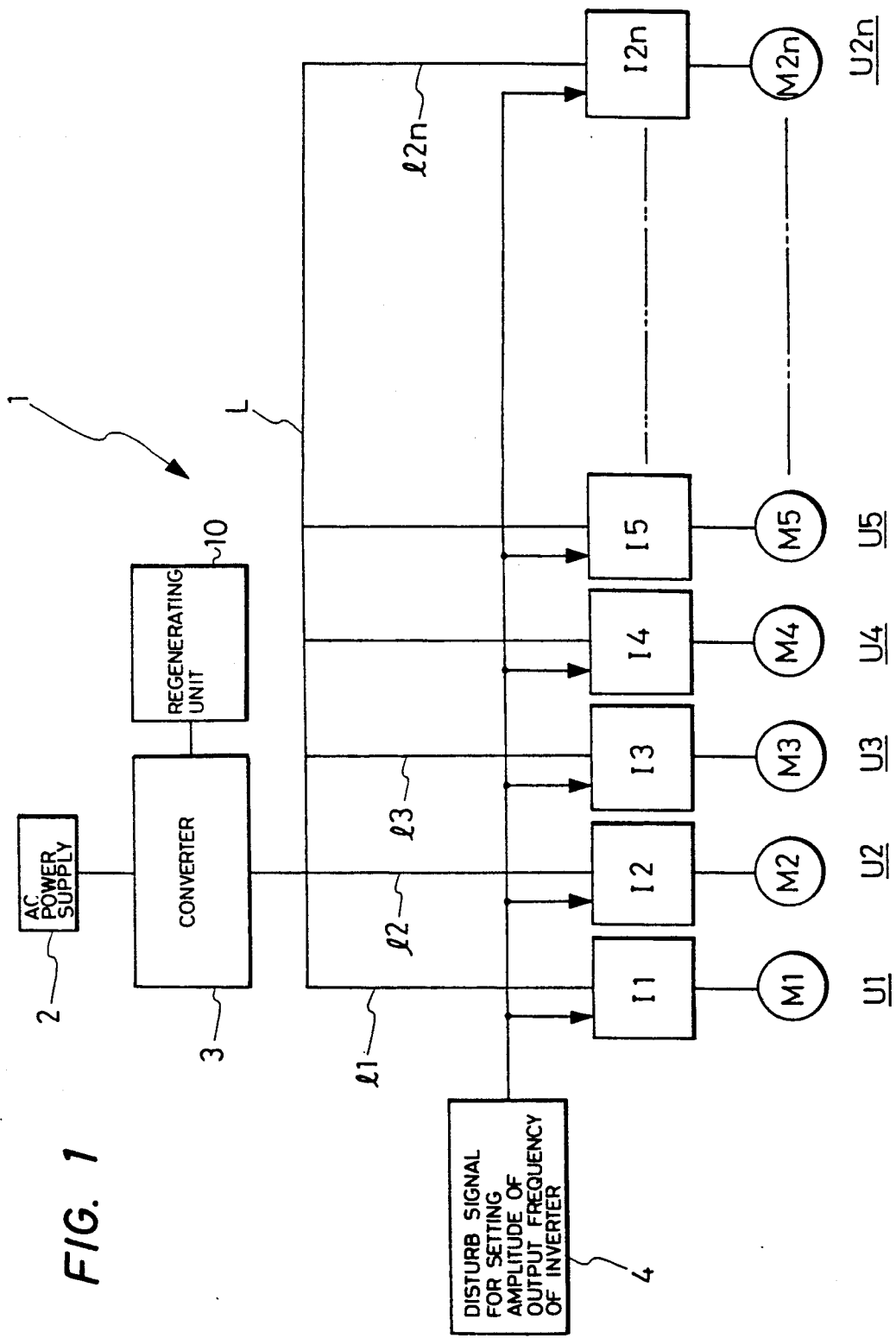
FIG. 1 is a circuit diagram for an embodiment of the present invention.

A drum driving circuit 1 of a winder embodying the present invention is shown in FIG. 1. In particular, independent traverse drum driving motors M1 to M2n are provided for individual juxtaposed winding units U1 to U2n of the automatic winder. The rotational speeds of the individual motors are controlled by inverters I1 to I2n, and AC current supplied from an AC power source 2 is converted into DC current by a converter 3 and supplied over connecting lines 11 to 12n to the inverters I1 to I2n of the individual units via a DC bus L which is wired along the individual units.

Further, a disturb signal for setting an amplitude of the output frequency of the individual inverters I1 to I2n is transmitted from a disturb unit 4 to the individual inverters.

Figure 4:
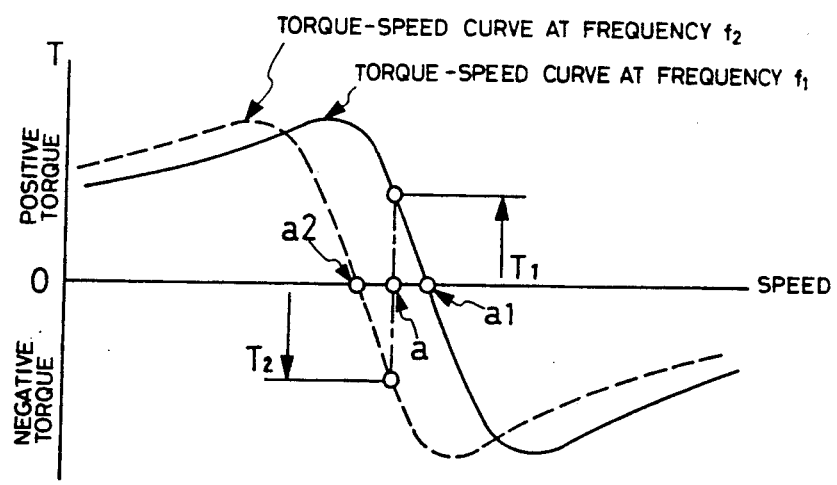
FIG. 4 is a graph illustrating a relationship between the frequency of a motor and a torque - speed curve.

It is to be noted that the torque characteristic when the output frequency of the drum driving inverters varies is illustrated in FIG. 4. In particular, when a motor is driven by an inverter, V/f constant control is normally employed. It is to be noted that V is a voltage, and f is a frequency. In this instance, if the slip of the motor becomes negative, that is, if the output frequency of the inverter is reduced so that the rotational speed (synchronous speed) of the rotating field becomes lower than the rotational speed of the rotor, the torque produced by the motor becomes negative, and braking operation is effected. Now, in FIG. 4, when the inverter frequency is f1, the motor is operating at a speed a1, and the torque is T1 which is a driving torque. In this condition, if the inverter frequency is reduced from f1 to f2, then the synchronous speed becomes lower than the rotational speed a of the rotor. In other words, the slip becomes negative, and the torque produced by the motor becomes T2 which is a braking torque.

Figure 3:
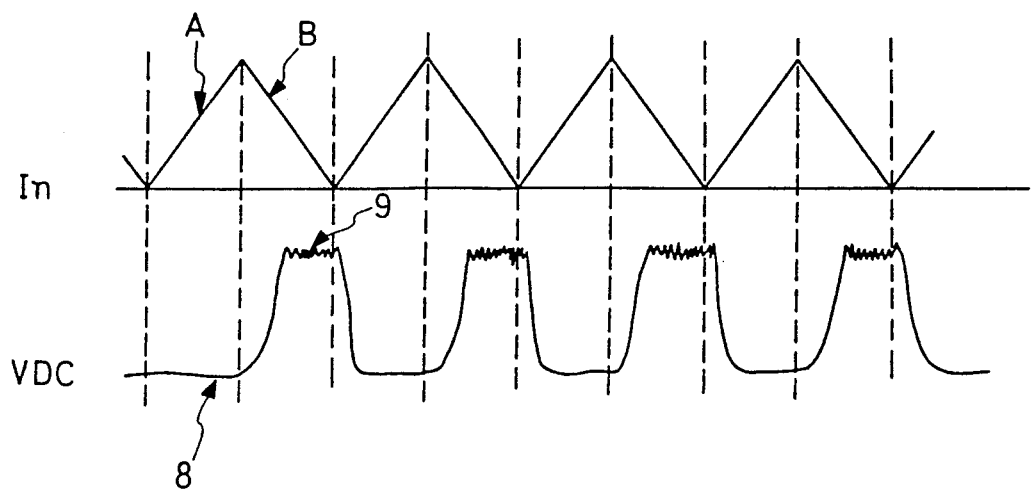
FIG. 3 is a diagram illustrating the voltage of the DC bus when all spindles are controlled to be accelerated and decelerated all at once.

In this condition, the motor is in generating operation, and the rotational energy of the motor and a load machine is converted into electric energy. In particular, if the inverters In are controlled so that the motors of all of the winding units may be accelerated as at A and decelerated as at B all at once as seen in FIG. 3, the electric energy generated in a decelerating region is sent into the converter 3 via the DC bus L of FIG. 1, and if the electric energy exceeds an allowable value, a safety device operates automatically so that winding by all of the units will be stopped. Accordingly, an inconsistency takes place that, in order to raise the braking effect in a decelerating region, it is necessary to reduce the frequency to a great degree, and consequently the electric energy generated increases.

Figure 2:
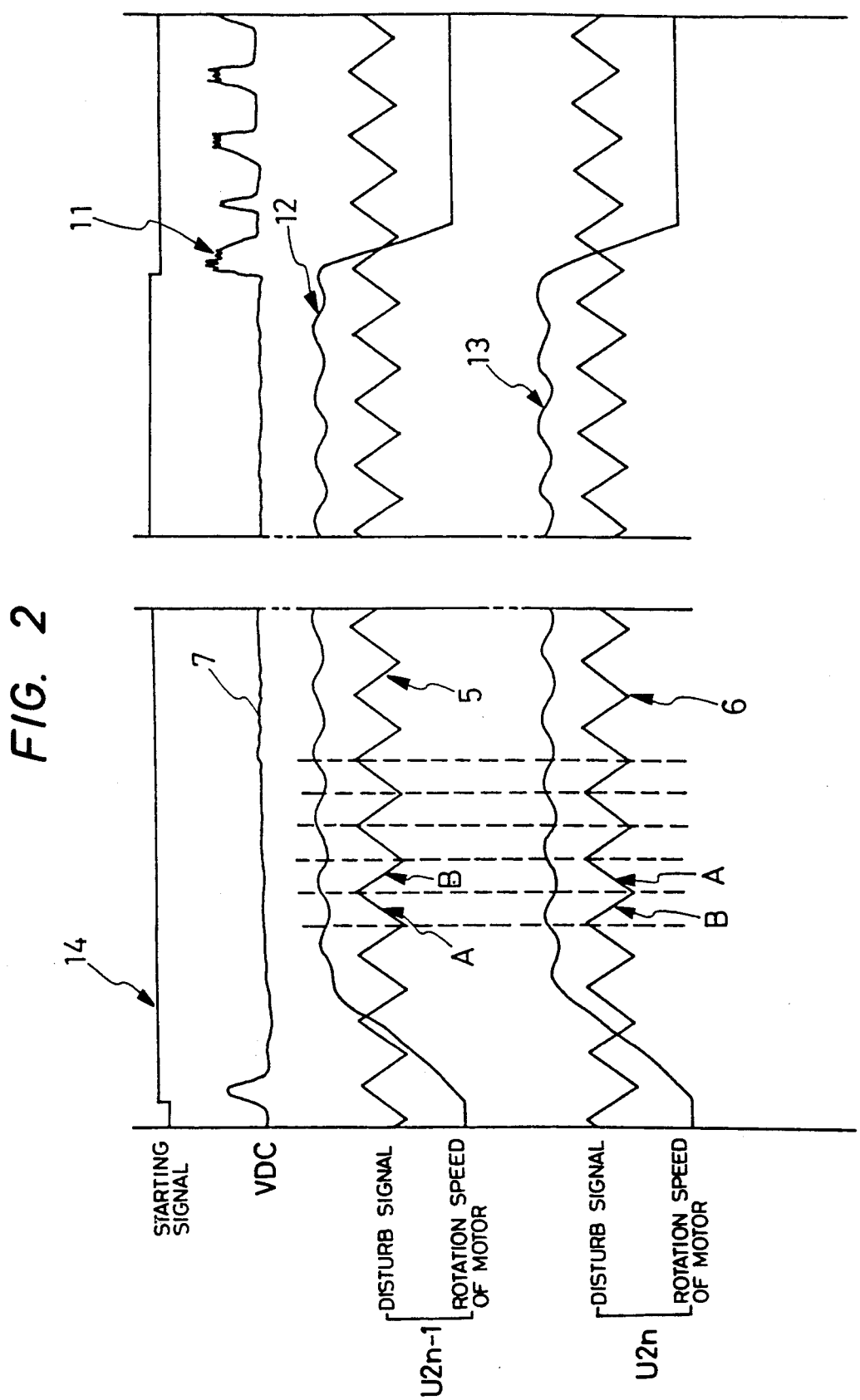
FIG. 2 is a diagram illustrating relationships of the rotational speed of a motor and the voltage of a DC bus to disturb signals according to an embodiment of the present invention.

Accordingly, according to an embodiment of the present invention, inverter control is such that the number of those inverters which are to be decelerated or accelerated is controlled in such a manner that the energy generated by the generating action described above (hereinafter referred to as regenerative energy) and the driving energy may cancel each other over the DC bus. In particular, a disturb signal such as a triangular wave 5 is delivered to the inverters, for example, of the odd-numbered winding units U2n-1 while another disturb signal such as a triangular signal 6 is delivered to the inverters I2n of the even-numbered winding units U2n as shown in FIG. 2. In short, the phases of triangular waves are set as a non-reverse phase and a reverse phase for the individual inverters. Accordingly, in the case of the embodiment described above, if the numbers of the inverters for the non-reverse phase and the reverse phase are set equal to each other, the number of the winding units in the decelerating region B and the number of the winding units in the accelerating region A become equal to each other.

By controlling the inverters in such a manner as described above, regenerative energy generated in the decelerating region B is consumed by the motors which are accelerated in the accelerating region A and is thus converted all into an output power of the motors so that all of it can be utilized.

Accordingly, the voltage VDC of the DC bus L always keeps a fixed level 7 as shown in FIG. 2 irrespective of acceleration or deceleration of the motors. Meanwhile, in case all of the units are accelerated or decelerated all at once in a synchronized relationship with each other, the voltage of the DC bus L increases as at 9 in the decelerating region B as indicated by a level diagram 8 in FIG. 3. The energy of the risen portion is escaped as heat from a regenerating unit 10 of FIG. 1.

Accordingly, according to an embodiment of the present invention, the regenerating unit 10 of FIG. 1 can be omitted during normal operation, but the regenerative energy (11 in FIG. 2) generated during deceleration when all of the winding units are to be stopped all at once in order to effect lot changing or when they are to be stopped all at once by some other reasons is discharged by the regenerating unit 10.

It is to be noted that, in FIG. 2, the relationships of the motor rotational speeds 12 and 13 and the voltage VDC of the DC bus L to the disturb signals 5 and 6 are illustrated. In particular, the disturb signals 5 and 6 delivered to the individual inverters of the odd-numbered winding units U2n-1 and the even-numbered winding units U2n are non-reverse and reverse in phase, and accordingly the rotations of the motors are accelerated and decelerated with some delay from the disturb signals. The voltage VDC of the DC bus L is constant while the motor starting signal 14 keeps on, and the regenerative energy and the driving energy cancel each other, or in other words, the regenerative energy is consumed promptly as the driving energy and contributes to rotation of the motors.

Accordingly, since the regenerative energy generated upon deceleration is consumed promptly by the motors being accelerated, a braking effect acts significantly upon the motors in the decelerating region. As a result, the slip between a drum and a package is increased, and the ribbon winding preventing effect is also improved.

It is to be noted that while in the embodiment described above a case is illustrated wherein the winding units are divided into and controlled for odd-numbered ones and even-numbered ones in order to make the number of non-reverse phase units and the number of reverse phase units of the disturb signals, it is a matter of course that any other dividing method is also possible only if the number of non-reverse phase units and the number of reverse phase units are equal to each other.

Further, while in the embodiment described above a case is described wherein the disturb signals make the number of non-reverse phase winding units and the number of reverse winding units equal to each other, it is also possible to control acceleration and deceleration of the units in such a manner that the voltage fluctuation of the DC bus L may remain within an allowable range. In this instance, the number of non-reverse phase units and the number of reverse phase units of the disturb signals need not always be made equal to each other.

In particular, even if the number of non-reverse phase units and the number of reverse phase units are accurately set equal to each other, if stopping of a drum due to a break of a yarn or due to full winding up of a package occurs, such a relationship as described above will be canceled. In this instance, the voltage of the DC bus L will undergo some fluctuation, but if such a fluctuation remains within an allowable range, it can be ignored.

In order to control more strictly, those winding units which are now operating may always be observed, and if the number of non-reverse phase units and the number of reverse phase units are controlled in response to the number of units which are operating in fact, the regenerative energy and the driving energy can cancel each other.

As apparent from the foregoing description, according to an embodiment of the present invention, since the regenerative energy generated upon deceleration of motors is consumed promptly for rotation of other motors in an accelerating region, the braking effect is high and there is an effect of prevention of ribbon windings. Further, since the regenerative energy is consumed by motors being accelerated without being discharged, also an energy saving effect is exhibited.

What is claimed is:

1. A driving controlling method for traverse drums of an automatic winder wherein each of a plurality of winding units thereof has a traverse drum driving motor and an associated inverter for providing an output signal to control the driving of said motor in accordance with the frequency amplitude of the output signal, said method comprising the steps of:

repetitively and periodically varying the frequency amplitude of the output signal of the traverse drum driving inverters, wherein the frequency amplitude is varied at regularly occurring intervals;

controlling a first number of the inverters to provide an output signal having a frequency amplitude which controls the associated motors to be decelerated;

controlling a second number of the inverters to provide an output signal having a frequency amplitude which controls the associated motors to be accelerated;

generating regenerative energy upon deceleration of the motors; and consuming motor driving energy upon acceleration of the motors;

wherein the generated regenerative energy and the consumed motor driving energy may cancel each other.

2. A driving controlling method according to claim 1, wherein the step of controlling the number of inverters comprises the step of controlling the number of inverters which are associated with the motors to be decelerated to be substantially the same number of inverters which are associated with the motors to be accelerated, in accordance with the variation of the output signal frequency of the traverse drum driving inverters.

3. In an automatic winder having first and second winding units provide with first and second traverse drum driving motors, respectively, a method of controlling the traverse drum driving motors comprising the steps of:

controlling the first traverse drum driving motor to accelerate and decelerate in a repetitive and periodic manner, wherein the first traverse drum driving motor is controlled to accelerate and decelerate at regularly occurring intervals;

generating energy with the first traverse drum driving motor upon deceleration thereof;

controlling the second traverse drum driving motor to accelerate and decelerate in a repetitive and periodic manner, wherein the second traverse drum driving motor is controlled to accelerate and decelerate at regularly occurring intervals such that the second drum driving motor always accelerates as the first drum driving motor decelerates and the second drum driving motor always decelerates as the first drum driving motor accelerates;

consuming energy generated by the first traverse drum driving motor upon acceleration of the second traverse drum driving motor;

generating energy with the second traverse drum driving motor upon deceleration thereof; and consuming energy generated by the second traverse drum driving motor upon acceleration of the first traverse drum driving motor.

4. A method as claimed in claim 3:

wherein the step of controlling the first traverse drum driving motor comprises the step of controlling the acceleration and deceleration of the first traverse drum driving motor in response to a first control signal; and wherein the step of controlling the second traverse drum driving motor comprises the step of controlling the acceleration and deceleration of the second traverse drum driving motor in response to a second control signal.

5. A method as claimed in claim 4, wherein the first and second control signals comprise first and second triangular wave signals.

6. A method as claimed in claim 5, wherein the acceleration of the first and second traverse drum driving motors is controlled in response to the upward slopes of the first and second triangular wave signals, respectively, and the deceleration of the first and second traverse drum driving motors is controlled in response to the downward slopes of the first and second triangular wave signals, respectively.

7. A method as claimed in claim 5, wherein the first and second triangular wave signals are out of phase with each other.

8. A method as claimed in claim 3:

wherein the step of controlling the first traverse drum driving motor comprises the step of controlling the acceleration and deceleration of the first traverse drum driving motor with a first inverter; and wherein the step of controlling the second traverse drum driving motor comprises the step of controlling the acceleration and deceleration of the second traverse drum driving motor with a second inverter.

9. A method as claimed in claim 8, wherein said step of controlling with the first inverter comprises the steps of:

transmitting a first driving signal from the first inverter to the first traverse drum driving motor, the first driving signal having a frequency amplitude;

periodically varying the frequency amplitude of the first driving signal; and controlling the speed of the first traverse drum driving motor in response to the frequency amplitude of the first driving signal.

10. A method as claimed in claim 9, wherein said step of controlling with the second inverter comprises the steps of:

transmitting a second driving signal from the second inverter to the second traverse drum driving motor, the second driving signal having a frequency amplitude;

periodically varying the frequency amplitude of the second driving signal; and controlling the speed of the second traverse drum driving motor in response to the frequency amplitude of the second driving signal.

11. A method as claimed in claim 8, wherein said step of controlling with the second inverter comprises the steps of:

transmitting a second driving signal from the second inverter to the second traverse drum driving motor, the second driving signal having a frequency amplitude;

periodically varying the frequency amplitude of the second driving signal; and controlling the speed of the second traverse drum driving motor in response to the frequency amplitude of the second driving signal.

12. A method as claimed in claim 3, further comprising the steps of:

transferring energy generated by at least one of the first and second traverse drum driving motors to an energy conductor; and consuming energy from the energy conductor with at least one of the first and second traverse drum driving motors upon acceleration of said at least one of the first and second traverse drum driving motors.

13. A method as claimed in claim 12, wherein the energy consumed in the step of consuming energy is substantially equal to the generated energy transferred in the step of transferring energy.

14. A method as claimed in claim 12, wherein the energy conductor comprises a DC bus.

15. A method as claimed in claim 14, further comprising the step of controlling the generation and consumption of energy to maintain the voltage of the DC bus within a predefined range.

16. A driving controlling method for traverse drums of a plurality of winding units of an automatic winder, wherein each winding unit is associated with a traverse drum driving motor and signal means for providing an output signal to control the driving speed of said motor in accordance with the frequency magnitude of the output signal, said method comprising the steps of:

cyclically varying the frequency magnitude of the output signal, wherein the frequency magnitude of the output signal is varied at regularly occurring intervals;

controlling a first number of the signal means to provide an output signal having a frequency magnitude which controls the associated motors to be decelerated;

controlling a second number of the signal means to provide an output signal having a frequency magnitude which controls the associated motors to be accelerated;

generating regenerative energy upon deceleration of the motors; and consuming motor driving energy upon acceleration of the motors;

wherein generated regenerative energy and consumed motor driving energy cancel each other.

17. A driving controlling method for traverse drums of a plurality of winding units of an automatic winder, wherein each winding unit is associated with a traverse rum driving motor and signal means for providing an output signal to control the driving speed of said motor in accordance with the frequency magnitude of the output signal, said method comprising the steps of:
varying the frequency magnitude of the output signal in a repetitive manner wherein the frequency magnitude of the output signal is varied at regularly occurring time intervals;
controlling a first plurality of the signal means to provide an output signal having a frequency magnitude which controls the associated motors to be decelerated;
controlling a second plurality of the signal means to provide an output signal having a frequency magnitude which controls the associated motors to be accelerated;
generating regenerative energy upon deceleration of the motors; and
consuming motor driving energy upon acceleration of the motors;
wherein the first and second plurality of signal means are equal to each other and wherein generated regenerative energy and consumed motor driving energy substantially cancel each other.

* * * * *